Jan. 16, 1962  J. J. BUNDSCHUH ETAL  3,016,811
AUTOMATIC EXPOSURE CONTROL FOR PHOTOGRAPHIC CAMERAS
Filed March 23, 1959  3 Sheets-Sheet 1

JOHN J. BUNDSCHUH
LOREN J. CRAIG
WILLIAM T. HOCHREITER
INVENTORS

BY R. Frank Smith
Robert W. Hampton
ATTORNEYS

Jan. 16, 1962     J. J. BUNDSCHUH ETAL     3,016,811
AUTOMATIC EXPOSURE CONTROL FOR PHOTOGRAPHIC CAMERAS
Filed March 23, 1959     3 Sheets-Sheet 2

JOHN J. BUNDSCHUH
LOREN J. CRAIG
WILLIAM T. HOCHREITER
INVENTORS

BY R. Frank Smith

Robert W. Hampton
ATTORNEYS

Jan. 16, 1962 J. J. BUNDSCHUH ETAL 3,016,811
AUTOMATIC EXPOSURE CONTROL FOR PHOTOGRAPHIC CAMERAS
Filed March 23, 1959 3 Sheets-Sheet 3
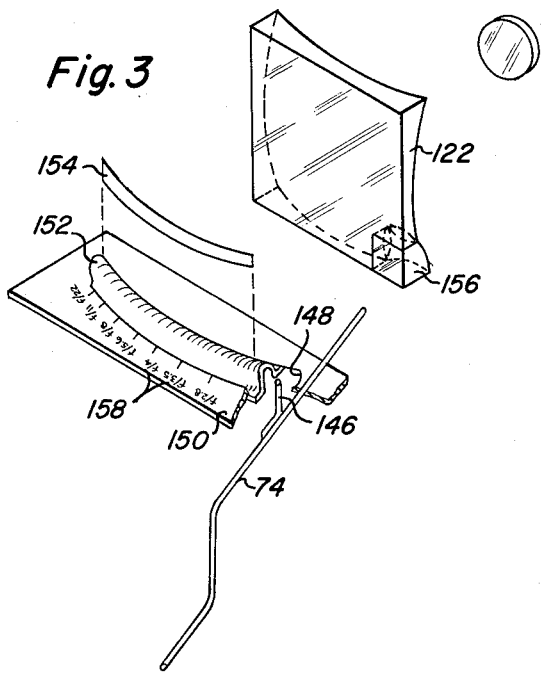
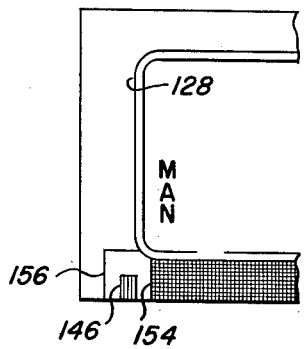
JOHN J. BUNDSCHUH
LOREN J. CRAIG
WILLIAM T. HOCHREITER
INVENTORS
BY R. Frank Smith
Robert W. Hampton
ATTORNEYS United States Patent Office 3,016,811
Patented Jan. 16, 1962

3,016,811
AUTOMATIC EXPOSURE CONTROL FOR
PHOTOGRAPHIC CAMERAS
John J. Bundschuh, Loren J. Craig, and William T. Hochreiter, Rochester, N.Y., assignors to Eastman Kodak Company, Rochester, N.Y., a corporation of New Jersey
Filed Mar. 23, 1959, Ser. No. 801,006
10 Claims. (Cl. 95—10)

The present invention relates to photographic cameras and more particularly concerns automatic exposure control systems for such cameras.

The exposure control system of a camera, that is the means for regulating the diaphragm aperture or shutter speed or some combination of these, may be operated automatically in response to variations in the brightness of the scene or object which is to be photographed. One method of automatically regulating such exposure has been to employ an "exposure meter," which may comprise a galvanometer-type electrical measuring instrument coupled to a photoelectric cell, for positioning a light-weight pointer as a function of scene brightness. The position of the pointer is then sensed by a member yieldably driven by manual operation. The yieldably driven member may set shutter speed or diaphragm opening or both.

It is a principal object of the present invention to provide an improved exposure control system of the foregoing type, wherein a maximum adjustment of the exposure control system is achieved in response to a minimum movement of a manually-operated actuating member which imparts the yieldable drive to the sensing member.

A further object of the invention is to multiply the motion of the manual actuating member for driving the sensing member and to multiply the motion of the sensing member for adjusting the exposure control mechanism in a camera of the foregoing type.

Other objects of the invention are:
To indicate in an infinity-frame viewfinder the adjustment of a camera for automatic or manual exposure control;
To indicate in such viewfinder the presence or absence of sufficient scene brightness for normal exposure under automatic control; and
To latch a camera in adjustment for automatic exposure control and to provide manual exposure control means with unlatching means to enable such manual exposure control means.

Other objects of the invention will appear from the following description, reference being made to the accompanying drawings, wherein:

FIG. 3 is an exploded isometric view of the low-light indicating mechanism; and

FIG. 4 is a rear view of the viewfinder signals as seen through the viewfinder eyepiece.

EXPOSURE CONTROL SYSTEM

*Automatic mode of exposure regulation*

Figure 1:
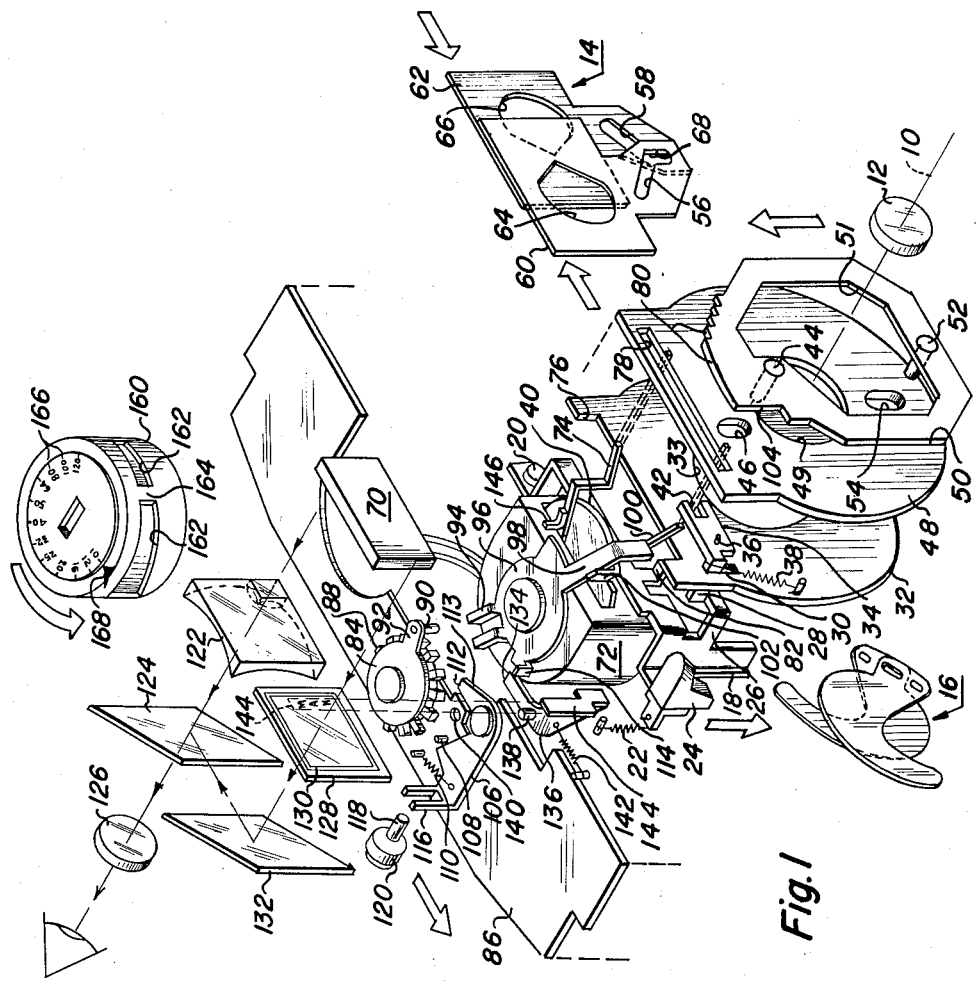
FIG. 1 is an exploded isometric view of the invention showing the exposure control mechanism adjusted for automatic control and showing the viewfinder and the film-speed compensating mechanism.

Referring to FIG. 1, a camera embodying the present invention has a longitudinal lens axis 10 on which are arranged a lens system, indicated generally at 12, a diaphragm mechanism 14, a shutter mechanism 16 and a photosensitive surface such as a strip of film (not shown). A camera actuating lever 18 is pivoted at 20 on a fixed member of the camera and is urged clockwise about its pivot by a spring 22, so that a manual knob 24, which is attached to lever 18, is normally maintained in a raised position. Knob 24 is accessible from the outside of the camera. Manual depression of knob 24 rocks lever 18 counterclockwise about pivot 20 for automatically setting the size of an exposure aperture in the diaphragm mechanism 14 as a function of the intensity of light from the viewed scene. This automatic setting is accomplished as follows.

An ear 26 on lever 24 underlies an ear 28 which extends through a vertical slot 30 of a fixed rear plate 32 having a central aperture 33 on the lens axis. Ear 28 is integral with a lever 34 which is pivoted at 36 on plate 32. Lever 34 is urged counterclockwise about its pivot by a spring 38, thereby maintaining contact between ears 28 and 26. Spring 22 is substantially stronger than spring 38; therefore, lever 18 is normally maintained in its maximum clockwise position where it is stopped by the bottom surface of a fixed member 40 and where it normally maintains lever 34 in its maximum clockwise position.

Figure 2:
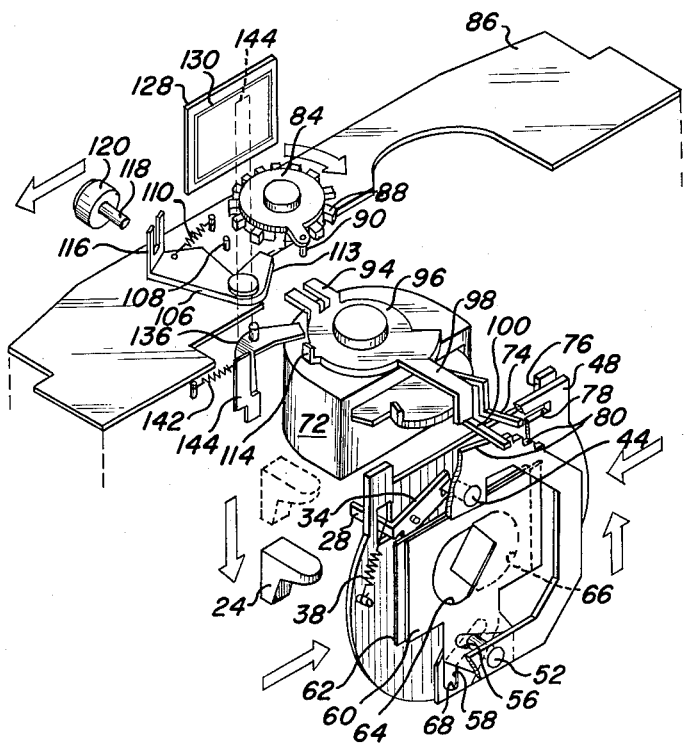
FIG. 2 is a view similar to FIG. 1 showing the exposure control mechanism adjusted for manual control.

A bifurcated tip 42 on lever 34 engages a pin 44, which extends through a vertical slot 46 in a fixed front plate 48, and which is secured to a sensing member 50 located in front of plate 48. Plate 48 and member 50 have respective central apertures 49 and 51 on the lens axis. A second pin 52, which is also secured to member 50, extends through a vertical slot 54 in plate 48 and engages respective complementary slots 56 and 58 in a pair of diaphragm vanes 60 and 62. Vanes 60 and 62 have respective apertures 64 and 66, each of which is capped, in the area of the lens axis, by the other vane when pin 52 engages a lower, vertically extending portion 68 of each slot 56 and 58. When the camera actuating lever 18 is initially rocked counterclockwise by manual depression of knob 24, ear 26 moves downward, thereby permitting spring 38 to rock lever 34 counterclockwise, as shown in FIG. 2, and raise pin 44, member 50 and pin 52. When pin 52 moves upward, it engages diagonally extending wing portions of the vane slots 56 and 58, thereby moving the vanes laterally toward each other so that their apertures 64 and 66 overlap on the lens axis. The extent of lateral movement of vanes 60 and 62, and therefore the area of the exposure aperture, are determined as follows.

A photoelectric cell 70 (FIG. 1) is mounted for illumination by the viewed scene or object and is electrically connected to a pivoted-coil electric measuring instrument 72 having a pointer 74 connected to the coil (not shown) and angularly positioned as a function of the energization of the coil by the cell. The cell and instrument are not shown in detail, being familiar to those skilled in the art, and are merely representative of a class of devices definable as exposure meters. A meter of this type has a mechanical output member, such as pointer 74, whose movement or position is controlled as a function of the intensity of light falling on the device. The meter may include, instead of a pivoted-coil instrument, a solenoid, a hot wire actuator or the like.

Pointer 74 of the instrument extends through a notch 76 in the rear plate 32 and through a slot 78 in the front plate 48 into cooperative relation with an upper cam surface 80 of the sensing member 50. When the sensing member is raised by spring 38 upon manual depression of the actuating knob 24, cam surface 80 engages pointer 74 at a differential lateral position, that is a function of the scene brightness. The shape of cam surface 80 is such that the sensing member 50 rises farther for dimmer scenes and thereby opens the exposure aperture of diaphragm vanes 60 and 62 further for such scenes. Steeper portions of cam surface 80 may be stepped, as shown at the right of that surface, to prevent the cam surface from moving the instrument pointer to the right upon contact therewith.

Upon further depression of knob 24 the exposure aperture remains fixed after cam surface 80 engages pointer 74 to limit the movement of sensing member 50 and the diaphragm vanes. At some position before full depression of knob 24, an ear 82 on lever 18 engages a shutter-tripping member (not shown) of any well-known type of shutter, thereby actuating the shutter mechanism to make a photographic exposure through the established diaphragm aperture.

The diaphragm setting mechanism described above has several advantageous features. First, the vertical travel of knob 24 is minimized for a given maximum possible motion of the diaphragm vanes 60 and 62. This is accomplished by the use of two motion multipliers. Lever 34 is pivoted closer to its rear 28 than to its tip 42 and therefore multiplies the vertical motion of lever 18 to produce a greater motion of pin 44. Also the sharp inclination of the upper portions of slots 56 and 58 in the diaphragm vanes causes the lateral movement of the vanes to be greater than the vertical movement of pin 52. Second, the amount of overlap of vanes 60 and 62 is minimized, thereby conserving lateral space, by providing the vertical section 68 in each of the vane slots 56 and 58. Pin 52 moves upward in section 68 of the vane slots while cam surface 80 on the sensing member 50 travels from its rest position into a position of first possible contact with pointer 78. In addition, the provision of the intermediate sensing member 50 in the vane-drive mechanism, rather than the location of cam surface 80 directly on one of the vanes, permits the cam surface to be moved through a relatively short distance while the diaphragm vanes are moved through a relatively long distance by virtue of the motion multiplication due to the inclination of the upper portions of vane slots 56 and 58.

*Manual mode of exposure regulation*

For flash photography and for situations with unusual subject backlighting it is desirable to override the automatic exposure control mechanism described above and to manually control the setting of the diaphragm aperture or other exposure regulating device such as a shutter speed ring. For this purpose, a disk 84 is pivotally mounted on a top plate 86 and is frictionally coupled to a knurled disk 88 which is accessible from the outside of the camera. A pin 90 is mounted on an arm 92 of disk 84 and engages a bifurcated arm 94 on a disk 96, which is pivotally mounted on the cover of the instrument 72, coaxially with the coil of that instrument. A second arm 98 on disk 96 has affixed thereto a manual pointer 100 extending through an anvil slot 78 on the front plate 48 for cooperation with cam surface 80 of the sensing member 50. When the camera is adjusted for automatic operation, arm 78 and manual pointer 100 are in their maximum clockwise positions where arm 98 is stopped by an ear 102 on member 40 and pointer 100 overlies a cutout section 104 of the sensing member 50. Therefore, pointer 100 is not engaged by the sensing member when the latter is raised into contact with the instrument pointer 74.

In order to adjust the camera for manual diaphragm setting, the knurled disk 88 is manually rotated clockwise (FIG. 2), thereby rotating disk 84 and its pin 90 clockwise. Pin 90 rotates disk 96 counterclockwise so that pointer 100 moves into a position overlying cam surface 80. The highest portion of cam surface 80 is on the left, as shown in FIGS. 1 and 2; therefore cam surface 80 engages only the manual pointer 100 during operation under manual control, regardless of the position of the instrument pointer 74.

*Override latch*

It may be desirable to maintain disk 84 latched in its automatic (counterclockwise) position during automatic operation of the camera, in order to prevent manual setting of the diaphragm if the knurled disk 88 is rotated inadvertently. For this purpose, a latch 106 is pivotally mounted on the top plate 86 and normally is maintained in an extreme clockwise position against a stop 108 by a spring 110. In this position of the latch, the tip 112 of an arm 113 thereof engages the left-hand face of an ear 114 on disk 96, thereby preventing the latter disk from being rotated counterclockwise into a manual-control position. A bifurcated ear 116 on latch 106 receives a pin 118 on a knob 120, which is mounted for horizontal sliding movement in an appropriate slot (not shown) in an outer cover member of the camera. Knob 120 is accessible from the outside of the camera, and when it is moved to the left (as viewed in FIG. 2), pin 118 rocks latch 106 counterclockwise away from its stop 108 and thereby moves the tip 112 of arm 113 rearwardly and out of engagement with ear 114, so that disk 96 can be rotated counterclockwise into a manual-control position.

VIEWFINDER SIGNALS

The present invention further includes two viewfinder signals, one for indicating whether the camera is adjusted for automatic or for manual exposure control and the other for indicating the presence or absence of sufficient scene brightness to make a normal exposure under automatic control. Both of these signals will be described in the environment of an infinity-frame viewfinder having a negative objective, or front lens 122 (FIG. 1) which receives light from the scene and transmits it through a 45-degree, semitransparent beam combiner 124 and through an eyepiece, or rear lens 126 to the photographer. The viewfinder also includes a plain glass 128, laterally offset from the objective 122, which is painted or which supports adjacent to itself a mask formed of film or the like to form a generally opaque area having certain transparent indicia thereon. These indicia include a frame line 130 and may include parallax and other markings (not shown) as well as the abbreviation "MAN," the latter indicating adjustment of a camera for manual diaphragm control. Scene light that passes through the transparent indicia at the plane of glass 128 is reflected by a 45-degree mirror 132 and by the beam combiner 124 through the eyepiece 126 and makes these indicia appear at infinity, provided the focal length of the eyepiece 126 is substantially equal to the length of the light path from the glass 128 to the eyepiece. It will be obvious to persons skilled in the art that numerous optical configurations other than the one illustrated may be employed for making the indicia at the plane of glass 128 appear at infinity or other comfortable viewing distance.

When the camera is set for automatic exposure control, with disk 96 in its maximum clockwise position as shown in FIG. 1, the rear surface of ear 114 engages an arm 134 of a lever 136. This lever is pivoted at 138 in a circular aperture 140 in plate 86. When the camera is adjusted for automatic exposure control, ear 114 maintains lever 136 counterclockwise against the tension of a spring 142. In this position of lever 136 a vertical arm 144 thereof lies in front of the symbol "MAN" on glass 128, so that the latter symbol does not appear in the viewfinder. When disk 96 is rotated counterclockwise to adjust the camera for manual exposure control in the manner previously described, ear 114 moves counterclockwise and permits spring 142 to rock lever 136 clockwise about its pivot, thereby moving the vertical arm 144 out of conjunction with the symbol "MAN," thereby permitting that symbol to appear in the viewfinder. The appearance of the symbol "MAN" and of frame 128 in the viewfinder from the rear of the camera are shown in FIG. 4.

It will be obvious that the viewfiinder signal described above may be modified to positively indicate automatic operation, such as with the symbol "AUTO," instead of or in addition to positively indicating manual operation.

The second viewfinder signal indicates the presence or absence of sufficient scene brightness for making a normal photographic exposure with the camera adjusted for automatic exposure control. Referring to FIG. 3, the instrument pointer 74 has a vertical indicator 146 affixed thereto and extending through an elongated, curved slot 148 in plate 150. Slot 148 describes an arc about the instrument-coil axis such that indicator 146 moves in this slot throughout the instrument range. An elongated viewing bubble 152 extends upward through slot 148 to enclose indicator 146 and lies in front of the lower edge of the viewfinder objective 122. Bubble 152 is transparent at its righthand end (as viewed in FIG. 3) and is otherwise made opaque, as by affixing a length of black tape 154 to all but the righthand end of the bubble. A small positive lens 156 occupies the lower righthand corner of the viewfinder objective 122 (as viewed from the front of the camera) to bring indicator 146 into focus when that indicator occupies the righthand portion of slot 148. At the latter position of indicator 146, the instrument receives minimum energization and indicates that an exposure aperture larger than the largest available in the camera is necessary for a normal exposure. The relation of the position of indicator 146 to scene brightness may be shown, for example, by an aperture scale 158 on plate 159 cooperating with the indicator. The appearance of indicator 146 in the viewfinder, when there is insufficient light for a normal automatic exposure, is shown in FIG. 4, wherein indicator 146 is shown at the extreme left since it is being viewed from the rear of the camera.

FILM-SPEED ADJUSTMENT

The exposure control system described above can be adjusted for changes in film speed by adjusting the sensitivity of the photoelectric cell which receives light from the viewed scene. For this purpose, a drum 160 (FIG. 1) which is accessible from the outside of the camera, surrounds cell 70 and has a tapered masking aperture 162, which may be discontinuous as at 164 for support, and which extends around the periphery of drum 160. A scale 166 on the top of the drum is disposed for cooperation with a fixed index mark 168. When drum 160 is rotated manually to set a desired film-speed indicium of scale 166 opposite index mark 168, aperture 162 is moved relative to the photoelectric cell and exposes the cell to scene lighting to a degree which is any appropriate function of the film speed. The adjustment of cell exposure in turn adjusts the sensistivity of the circuit comprising the cell and measuring instrument as a function of film speed.

The invention has been described in detail with particular reference to preferred embodiments thereof, but it will be understood that variations and modifications can be effected within the spirit and scope of the invention as described hereinabove and as defined in the appended claims. In particular, although the invention has been described in relation to an automatic exposure control system wherein the diaphragm is adjusted automatically as a function of scene brightness, it will be obvious to persons skilled in the art that many features of the invention have equal utility in other exposure control systems, for example in a system wherein the shutter speed is adjusted automatically as a function of scene brightness.

We claim:

1. In a camera having a lens system disposed along a lens axis for focusing an image of a viewed scene onto a photosensitive surface; a photoelectric cell disposed for illumination by light from said scene; a galvanometer having a movable coil connected to said cell and energized thereby to position said coil as a function of the intensity of said light; a pointer connected to said coil for movement therewith; and a manually movable camera actuating device; the combination comprising: a sensing member having a cam surface normally out of engagement with said pointer and adapted for differential movement into engagement with said pointer for sensing the position thereof; a linkage yieldably coupling said sensing member to said actuating device for moving said sensing member a first distance to engage said cam surface with said pointer in response to manual movement of said actuating member through a second and shorter distance; a pair of diaphragm vanes having respective apertures disposed in overlapping relation on said axis to form a composite exposure aperture, said vanes being adapted for opposed sliding movement to vary the size of said exposure aperture; and a respective pin-and-slot coupling between said sensing member and each of said vanes for moving each vane a third distance, greater than said second distance, in response to said movement of the sensing member, for determining the size of said exposure aperture as a function of said intensity.

2. In a camera having means for focusing an image of a viewed scene onto a photosensitive surface; an exposure meter positioned for energization by light from said scene, with a mechanical output member constituting a part of said meter and positioned as a function of the intensity of said light; and a manually movable camera actuating member; the combination comprising: a sensing member normally out of engagement with said mechanical output member and adapted for differential movement into engagement with said output member for sensing the position thereof; first motion-multiplying means yieldably coupling said sensing member to said actuating member for moving said sensing member a first distance in a predetermined path into engagement with said output member in response to manual movement of said actuating member through a second and shorter distance; diaphragm means having a variable-sized exposure aperture for regulating the intensity of said image; and second motion-multiplying means coupling said diaphragm means to said sensing member for moving a part of said diaphragm means a third distance greater than said first distance in response to said movement of the sensing member, for determining the size of said exposure aperture as a function of said intensity, whereby progressively greater movements are imparted to said sensing member and said part of the diaphragm means in response to a predetermined movement of said actuating member.

3. The combination defined in claim 2, with: an infinity-frame viewfinder; override means normally disposed in a first position outside said predetermined path and adapted to be moved under manual control to a differential second position in said path for intercepting said sensing member to determine the size of said exposure aperture as a function of the position of said override means; and means coupled to said override means for indicating in said viewfinder the position of said override means.

4. The combination defined in claim 3, with: a latch for normally maintaining said override means in said first position and manually operable means for releasing said latch to permit movement of said override means to said second position.

5. The combination defined in claim 2, with: a viewfinder comprising a positive rear lens and a bifocal front lens having a negative segment and a positive segment; and a low-light indicator movable in conjunction with said output member into alignment with said rear lens and the positive segment of said front lens when said output member is in a position corresponding to less than a predetermined intensity of said light.

6. In a camera having means for focusing an image of a viewed scene onto a photosensitive surface; and an exposure meter positioned for energization by light from said scene, with a mechanical output member constituting a part of said meter and positioned as a function of the intensity of said light; the combination comprising: exposure regulating means disposed in cooperative relation with said output member for regulating the exposure of said photosensitive surface in a first mode, automatically as a function of the intensity of said light; manual override means cooperating with said exposure regulating means for selectively regulating the exposure of said photosensitive surface in a second mode, under manual control, regardless of the intensity of said light; indicator means controlled by said override means for producing a visual signal to indicate the selected mode of exposure regulation; and a viewfinder in which said signal is visible and having means for displaying said signal at apparent infinity.

7. The combination defined in claim 6, wherein said viewfinder comprises at least one lens located on a viewfinder axis for receiving light from said viewed scene and for transmitting the same rearwardly to a viewing locus; and wherein said indicator means includes a signal-forming means offset from said viewfinder axis and disposed to receive light from said scene and to transmit a part thereof rearwardly to form a visual signal, means for transmitting said visual signal toward said locus, and means constituting a part of said signal-forming means and coupled to said override means for changing said visual signal in response to a change in the mode of exposure regulation.

8. The combination defined in claim 7, wherein said viewfinder comprises respective rear and front lenses disposed on said viewfinder axis, and wherein said last-named transmitting means includes a mirror disposed behind said signal-forming member for reflecting said visual signal toward said viewfinder axis; and a beam combiner on said viewfinder axis between said front and rear lenses for receiving said reflected signal and reflecting at least a part thereof toward said rear lens and for transmitting at least a part of the light from said front lens toward said rear lens.

9. The combination defined in claim 7, wherein said signal-forming means includes a flat, generally opaque mask disposed in a plane substantially perpendicular to said viewfinder axis and having at least one light-transmitting area, and said part of the signal-forming means comprises an opaque member coupled to said override means and disposed rearwardly of said mask for movement relative to said mask in response to a change in the mode of exposure regulation.

10. In a camera having means for focusing an image of a viewed scene onto a photosensitive surface; and an exposure meter positioned for energization by light from said scene, with a mechanical output member constituting a part of said meter and positioned as a function of the intensity of said light; the combination comprising: means disposed in cooperative relation with said output member for regulating the exposure of said photosensitive surface automatically as a function of the intensity of said light; a viewfinder comprising a positive rear lens and a bifocal front lens having a negative segment and a positive segment; and a low-light indicator movable in conjunction with said output member into alignment with said rear lens and the positive segment of said front lens when said output member is in a position corresponding to less than a predetermined intensity of said light.

References Cited in the file of this patent

UNITED STATES PATENTS

| | | |
|---|---|---|
| 2,058,532 | Tuttle | Oct. 27, 1936 |
| 2,091,881 | Riszdorfer | Aug. 31, 1937 |
| 2,153,132 | Crowther | Apr. 4, 1939 |
| 2,242,043 | Sanger | May 13, 1941 |
| 2,360,256 | Mihalyi | Oct. 10, 1944 |
| 2,841,064 | Bagby | July 1, 1958 |